United States Patent
Lewis et al.

(10) Patent No.: US 9,280,630 B1
(45) Date of Patent: Mar. 8, 2016

(54) MODIFIED STANDARD CELLS TO ADDRESS FAST PATHS

(71) Applicant: International Business Machines Corporation, Armonk, NY (US)

(72) Inventors: Daniel Lewis, Bangalore (IN); Rahul M. Rao, Bangalore (IN); Adarsh Subramanya, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/535,701

(22) Filed: Nov. 7, 2014

(51) Int. Cl.
*G06F 17/50* (2006.01)
*H03K 19/096* (2006.01)
*H03K 19/20* (2006.01)

(52) U.S. Cl.
CPC .......... *G06F 17/5059* (2013.01); *H03K 19/096* (2013.01); *H03K 19/20* (2013.01)

(58) Field of Classification Search
None
See application file for complete search history.

(56) References Cited

U.S. PATENT DOCUMENTS

| | | | | |
|---|---|---|---|---|
| 4,868,422 A * | 9/1989 | Daniele | .............. | H03K 19/0005 326/103 |
| 5,259,006 A | 11/1993 | Price et al. | | |
| 5,861,762 A * | 1/1999 | Sutherland | ........... | H03K 19/215 326/113 |
| 6,172,525 B1 * | 1/2001 | Wennekamp | ........ | H03K 17/163 326/82 |
| 6,188,249 B1 | 2/2001 | Becker | | |
| 6,292,027 B1 * | 9/2001 | Dhong | ............... | H03K 19/0948 326/113 |
| 7,996,812 B2 | 8/2011 | Kotecha et al. | | |
| 8,407,655 B2 | 3/2013 | Oh et al. | | |
| 2001/0007144 A1 | 7/2001 | Terazawa | | |
| 2003/0058001 A1 * | 3/2003 | Boerstler | ............. | H03K 19/215 326/113 |
| 2005/0268263 A1 | 12/2005 | Sun et al. | | |
| 2007/0035329 A1 | 2/2007 | Madurawe | | |
| 2008/0120588 A1 | 5/2008 | Becker | | |
| 2012/0290660 A1 | 11/2012 | Rao et al. | | |
| 2013/0185692 A1 | 7/2013 | Kim et al. | | |

* cited by examiner

*Primary Examiner* — Jany Richardson
(74) *Attorney, Agent, or Firm* — David B. Woycechowsky

(57) ABSTRACT

Circuitry including a logic circuitry portion and a delay circuitry portion, with the circuitry having the following features: (i) the logic circuitry is designed to receive a set of input signals including a first input signal and a second input signal; and (ii) the delay circuitry portion includes a transistor connected so that the first input signal gates the second input signal. In some embodiments, the first and second input signals are chosen because it is expected that the second input signal will arrive at the circuitry before the first input signal so that the gating of the second signal by the first signal will cause the logic circuitry portion to receive the first and second signals at substantially the same time. Also, circuitry where a first output signal from a logic circuitry portion is gated by a second output signal.

14 Claims, 4 Drawing Sheets

MODIFIED STANDARD CELLS TO ADDRESS FAST PATHS

BACKGROUND OF THE INVENTION

The present invention relates generally to the field of processor design, and more particularly to design of "standard cells" used in processor design.

When manufacturing sophisticated devices, such as integrated circuits on chips, many factors in the design and manufacturing process can affect the performance and operability of the devices. One factor that has been found to play a role in high quality integrated circuit devices relates to the timing differences of communication and other signals as they travel across the circuits. Therefore, it is common to find and test the "timing paths" within the circuit along which the various signals will travel to ensure that the most important paths or bottleneck paths (for example, the critical timing paths) operate properly.

In processor design methodology, a given signal path will have some relative degree of "speed" depending upon factors such as delay imparted by circuitry components through which the path passes the signal and/or path length. Accordingly, there are relatively fast paths (or fast arcs) and relatively slow paths (or slow arcs). Sometimes a fast path signal and a slow path signal should ideally arrive at a common destination (such as a logic gate) at the same time, but they do not arrive simultaneously because one signal is faster than the other. This is called "delay." Conventionally, delay is dealt with clocks and timers that determine when the fast and slow signals can be received by the circuitry (such as a logic gate) that is supposed to receive the two signals simultaneously. In some conventional solutions, "standard cell methodology" is used in designing circuitry that uses clocks and/or timers to account for relative delay among multiple input signals received at a logic gate.

Slow paths usually have excessive logic to traverse between the launching and capturing latch. Fast paths have lesser logic to traverse through before reaching the capturing latch. Thus, there exists a risk of the "fast" signal being too fast and passing through multiple latch stages in a single clock cycle. Fast paths are addressed by varying the following in the affected timing path: (i) drive strength; (ii) signal routing; (iii) wire placement; and/or (iv) wire dimensions. Fast paths can further be addressed by introducing specific slow (or delay) cells which increase the delay in the path. The time lag of a slow path signal, relative to a fast path signal, is sometimes herein referred to as a "timing slack."

As referenced above, network delay is one design and performance characteristic to be considered in a computer network. The delay specifies how long it takes for a bit of data, or signal, to travel across the computer network from one endpoint (node) to another. The delay is typically measured in fractions of seconds, such as picoseconds (ps). Electronic logic gates used in circuit design can exhibit different "logical efforts" for different inputs. These types of gates are called asymmetric gates. Asymmetric gates can increase or decrease critical path speed in a network by changing the "logical effort" along the critical path of the circuit.

Another design approach is the use of early mode padding. The goal is to ensure that signals do not "fly through" multiple stages in one (1) clock cycle. Some conventional methods to prevent "fly through" are as follows: (i) using variable delays along different GCLK (global clock) to latch paths; (ii) using transparency window of latches; (iii) incorporating latch clock timing circuits; (iv) the use of logic gates; and/or (v) applying several stages of logic.

SUMMARY

According to a first aspect of the present invention, circuitry includes: a logic circuitry portion; and a delay circuitry portion including a first transistor. The logic circuitry portion is structured and/or electrically connected to: (i) receive a set of input signals including at least a first input signal and a second input signal; and (ii) perform logic functionality on the set of input signals to generate a set of output signal(s). The first transistor is structured and/or electrically connected to gate the first input signal with the second input signal so that the first input signal is not received by the logic circuitry portion until the second input signal has arrived at the first transistor.

According to a further aspect of the present invention, circuitry includes: a logic circuitry portion; and a delay circuitry portion including a first transistor. The logic circuitry portion is structured and/or electrically connected to: (i) receive a set of input signal(s); and (ii) perform logic functionality on the set of input signals to generate a set of output signal(s) including at least a first output signal and a second output signal. The first transistor is structured and/or electrically connected to gate the first output signal with the second output signal so that the first output signal is not output by the logic circuitry portion until the second output signal has arrived at the first transistor.

According to a further aspect of the present invention, a method of designing an integrated circuit includes the following steps (not necessarily in the following order): (i) defining a set of standard cell(s) including code based representations of a logic circuitry portion, and a delay circuitry portion including a first transistor; and (ii) applying the set of standard cell(s) into an integrated circuit design so that: (a) the logic circuitry portion is structured and/or electrically connected to: receive a set of input signals including at least a first input signal and a second input signal, and perform logic functionality on the set of input signals to generate a set of output signal(s), and (b) the first transistor is structured and/or electrically connected to gate the first input signal with the second input signal so that the first input signal is not received by the logic circuitry portion until the second input signal has arrived at the first transistor.

DETAILED DESCRIPTION

Figure 1:
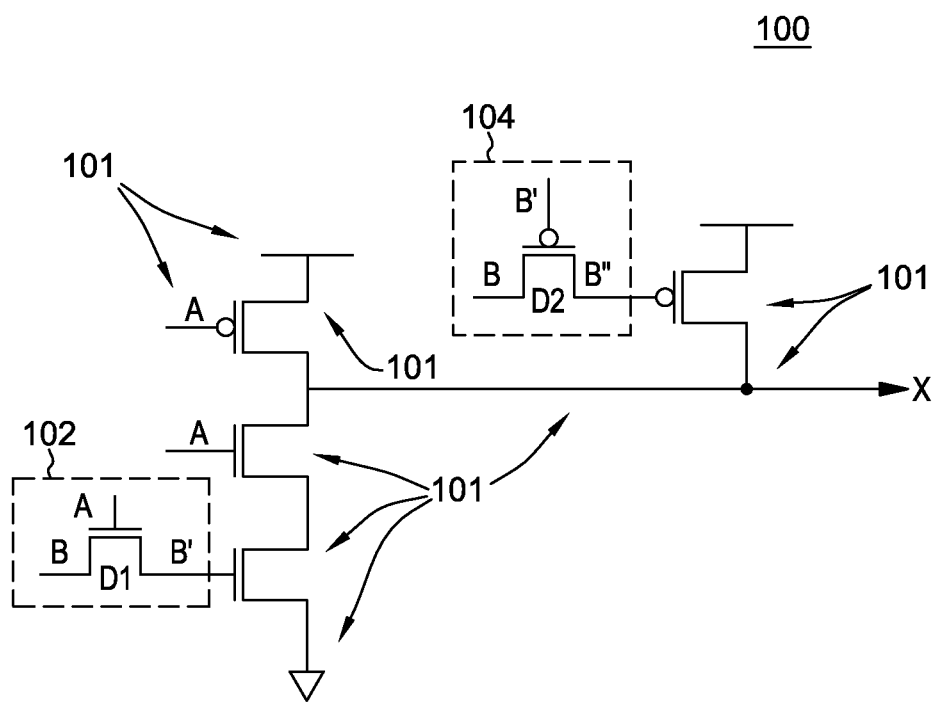
FIG. 1 is a schematic view of a first embodiment of a standard cell according to the present invention.

Some embodiments of the present invention are directed to circuitry, including a logic circuitry portion and a delay circuitry portion, with the circuitry having the following features: (i) the logic circuitry is designed to receive a set of input signals including a first input signal and a second input signal; and (ii) the delay circuitry portion includes a transistor connected so that the first input signal gates the second input signal. In some embodiments, the first and second input signals are chosen because it is expected that the second input signal will arrive at the circuitry before the first input signal, so that the gating of the second signal by the first signal will cause the logic circuitry portion to receive the first and second signals at substantially the same time. In some embodiments, a first output signal from a logic circuitry portion (for example, an output signal expected to be output relatively quickly by the logic circuitry portion) is gated by a second output signal (for example, an output signal expected to be output relatively slowly by the logic circuitry portion).

Some embodiments of the present invention focus on "delaying" specific timing arcs in a (cell) design, conditional upon the arrival of the slower signal, while maintaining the logical function of the design (cell). In some embodiments of the present invention, the delay and logic circuitry portions are implemented using a single standard cell. Other embodiments are not implemented with a standard cell (for example, implemented as part of a complex custom "flat" design). In some embodiments, a timing delay of a specific arc is conditional upon arrival of a slower signal.

Some embodiments of the present invention are directed to standard cells that include both: (i) logic circuitry to perform a logic function; and (ii) delay circuitry. The delay circuitry is designed to: (i) delay fast-to-arrive input signal(s) relative to slow-to-arrive input signal(s); while (ii) avoiding any change the logic functionality of the standard cell. While most of the discussion of embodiments, below, will focus on embodiments where one or more standard cell input(s) is/are delayed, some embodiments of the present invention may delay an output signal (even if these potential embodiments do not delay any of the input signal(s)). As used herein, the term input/output (I/O) signal will refer to a signal that is either: (i) input to a standard cell, or (ii) output from a standard cell.

Some embodiments are used to correct expected timing differences between multiple standard cell input signals without adding additional external slow cells, and/or affecting other circuit paths. In various circuitry designs, timing slacks" on the fast timing paths in a design have a wide range of magnitudes. For paths with timing slacks of relatively small magnitudes, some embodiments of the present invention include customized standard cells to perform targeted slow down on the fast timing path(s) (also herein referred to as "fast arcs") through the cell, instead of adding slow cells externally. In some embodiments, the customized cells: (i) address only the required fast arc and are structured and/or located to avoid affecting other arcs; (ii) reduce the usage of additional delay cells in the design; (iii) efficiently use and/or reduce the general circuit area; (iv) enhance wiring availability; and/or (v) reduce power consumption.

Usually, in a combinational standard cell, the inputs arrive at different times because, prior to arriving at the combinational standard cell, one input signal travels through a faster path than the other input signal. Faster inputs are generally connected to the transistor closer to the power rail to provide for quicker charge/discharge for the slower input signal. Some embodiments of the present invention utilize this characteristic and create standard combinational cells including a pass transistor gated by the slower input signal. This pass transistor controls the switching of the fast input signal, thus providing a significant delay for the fast input signal to: (i) maintain the functionality of the circuit; and (ii) reduce and/or eliminate the difference in timing between the fast input signal and the slow input signal.

In some embodiments of the present invention, this generic approach can be extended to different types of standard cells. The targeted slowdown of only the fast arc being corrected for reduces the number of explicit delay cells added for early mode in the design, thereby reducing area required by the design. Compared to adding dedicated delay cells (with no logic functionality), some embodiments of the present invention effectively reduce the number of signals in the design because pass transistors are included within the standard cell in these embodiments. These factors also contribute to power savings. Further, in some embodiments of the present invention, the effective switched capacitance is reduced in the scenario where the slower signal has high switching activity.

In some embodiments of the present invention, increased area is made available for critical ECO (engineering change order) implementations around latch clusters where conventional designs typically place delay cells (which become unnecessary under the present invention).

Some embodiments of the present invention may further include one, or more, of the following features, characteristics and/or advantages: (i) slowing down fast paths by using minimally invasive circuit approaches; (ii) use of asymmetric gates where the delay of one arc is slowed down; (iii) minimal routing overhead of early mode padding; and/or (iv) reduced power consumption.

Some embodiments of the present invention will be discussed in the following paragraphs with reference to circuitry schematics shown in the Figures. As a preliminary note to this discussion, while the following embodiments are implemented by standard cells, not all embodiments of the present invention are necessarily implemented by standard cells.

As shown in FIG. 1, standard cell 100 includes logic circuitry (also called NAND (negated AND) gate) 101; and delay circuitry 102, 104 (including first delay transistor (D1) 102; second delay (D2) transistor 104); and output signal line X. Delay circuitry 102, 104 serves to delay fast input signal B relative to slow input signal A. More specifically: (i) because slow signal A switches on transistor 102 signal B' will not be active until slow signal A arrives at the standard cell; and (ii) because signal B' switches on transistor 104, signal B" will not be active until signal B' has been made active by the arrival, at the standard cell, of slow signal A. In this embodiment, B', rather than A, is used to gate transistor in order to reduce the amount of gate capacitance in the standard cell.

In a variation on standard cell 100, second delay transistor 204 may be omitted. This variation is appropriate in cases where only one direction arc needs to be slowed down (for example, rising transition at B that results in a falling transition at the output). This is potentially useful in scenarios where signal B has its rising transition being fast while the falling transition is slow. Adding delay transistor 202 alone, ensures that only the rising transition at B is slowed, without affecting the falling transition.

Figure 2:
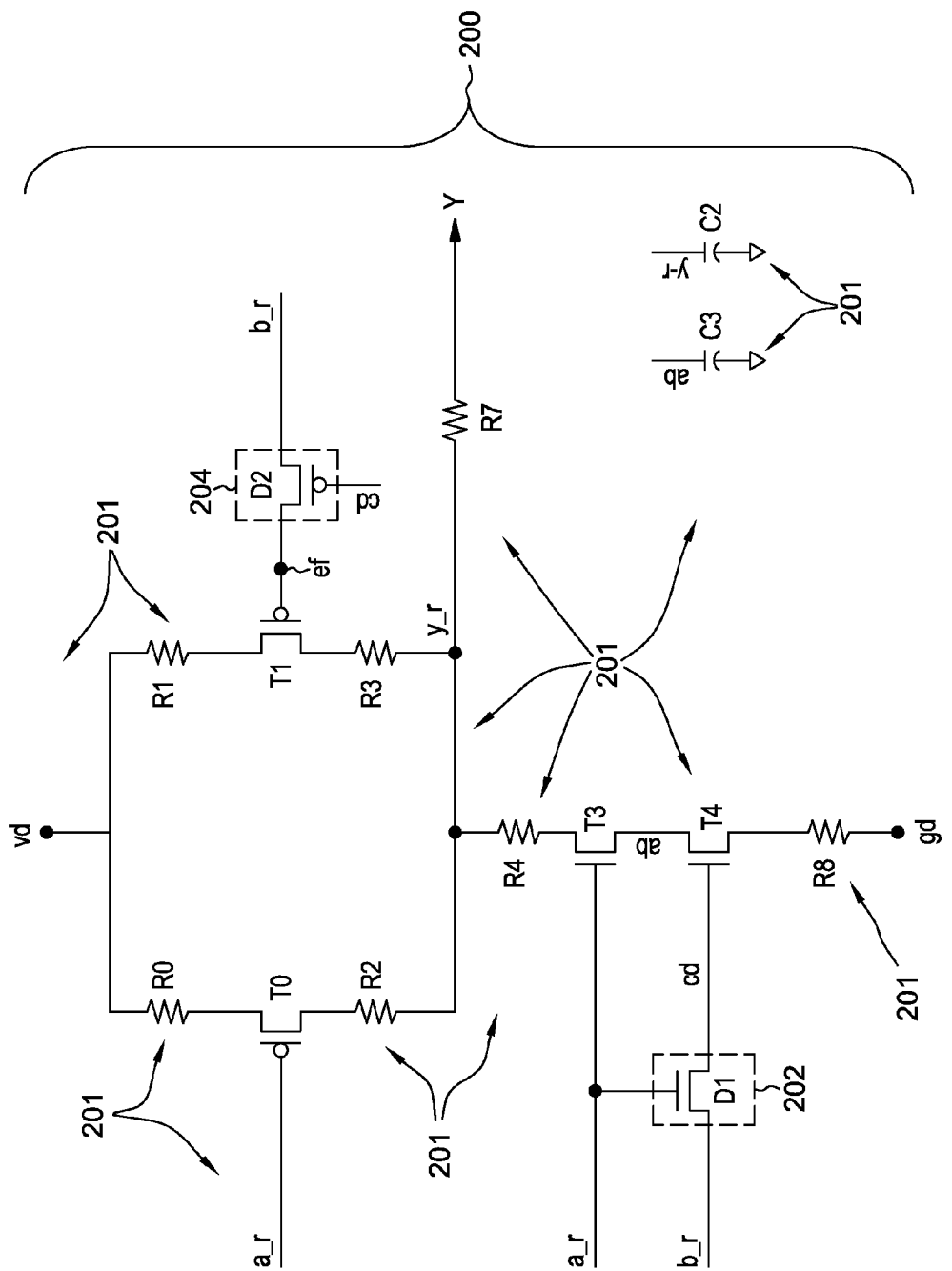
FIG. 2 is a schematic view of a second embodiment of a standard cell according to the present invention.

As shown in FIG. 2, standard cell 200 includes logic circuitry 201; first delay transistor (also called D1) 202; second delay transistor (also called D2) 204; and signal lines b_r (also called the fast signal), cd. Logic circuitry 201 includes: signal lines a_r (also called the fast signal), y_r, ab, cd, ef; logic transistors T0, T1, T3, T4; bias resistors R0, R1, R2, R3, R4, R7, R8; timing capacitors C2, C3; input voltage line vd; and ground line gd. Signal line y_r communicates output signal y.

In standard cell 200, logic circuitry 201 provides logic functionality of a NAND cell, where the output is at logic high when either or all of the inputs are at a logic low. The resistors of logic circuitry 201 represent the junction, contact and via resistances in the standard cell, while capacitors of logic circuitry 201 represent the junction, wire and parasitic capacitances.

In standard cell 200: (i) delay transistor D1 prevents fast signal b_r from getting through (this is, passing a signal along to signal line cd) until the arrival of slow signal a_r; and (ii) delay transistor D2 also prevents fast signal b_r from getting through (this is, passing a signal along to signal line ef) until an active signal is present on signal line cd.

Figure 3:
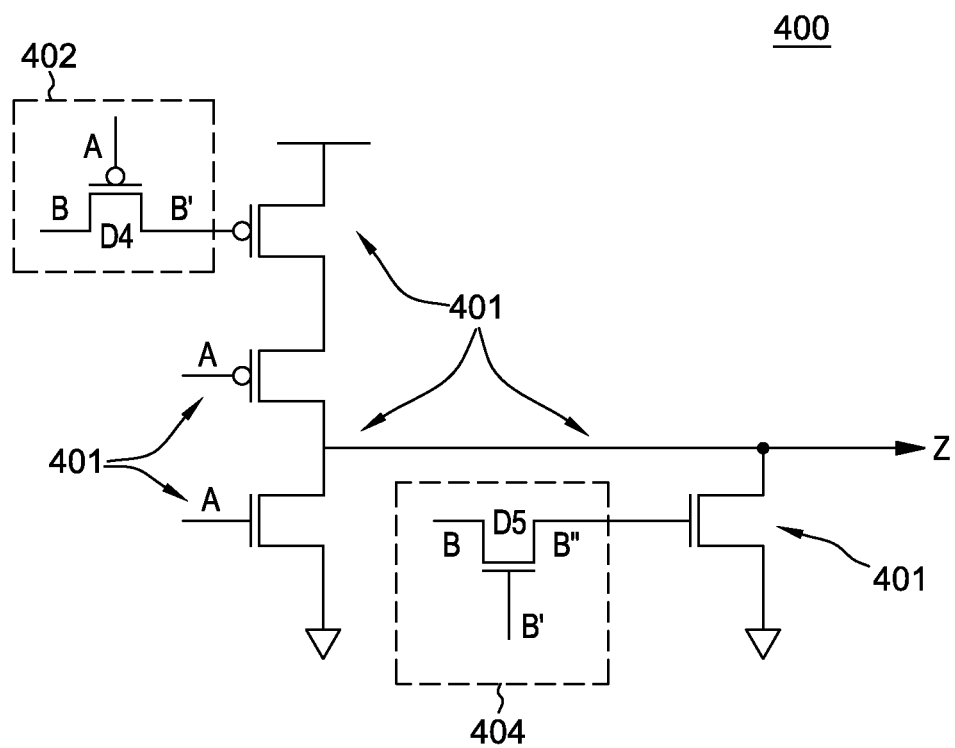
FIG. 3 is a schematic view of a third embodiment of a standard cell according to the present invention.

As shown in FIG. 3, standard cell 400 includes: logic circuitry 401; PFET delay transistor (D4) 402; NFET delay transistor (D5) 404; slow input signal line A; fast input signal line B; output signal line Z; and signal lines B', B". Logic circuitry 401 performs the logic functionality of a NOR cell, where in the output is at logic low, when one or all of the inputs are at logic high.

Standard cell 400 is generally similar to previously-discussed standard cell 100. This circuit design is similar to logic circuit 100 in FIG. 1, except standard cell 400 is more appropriate for use with a pFET stack (for example, a NOR gate). On the other hand, standard cell 100 is more appropriate for use with an nFET stack.

Figure 4:
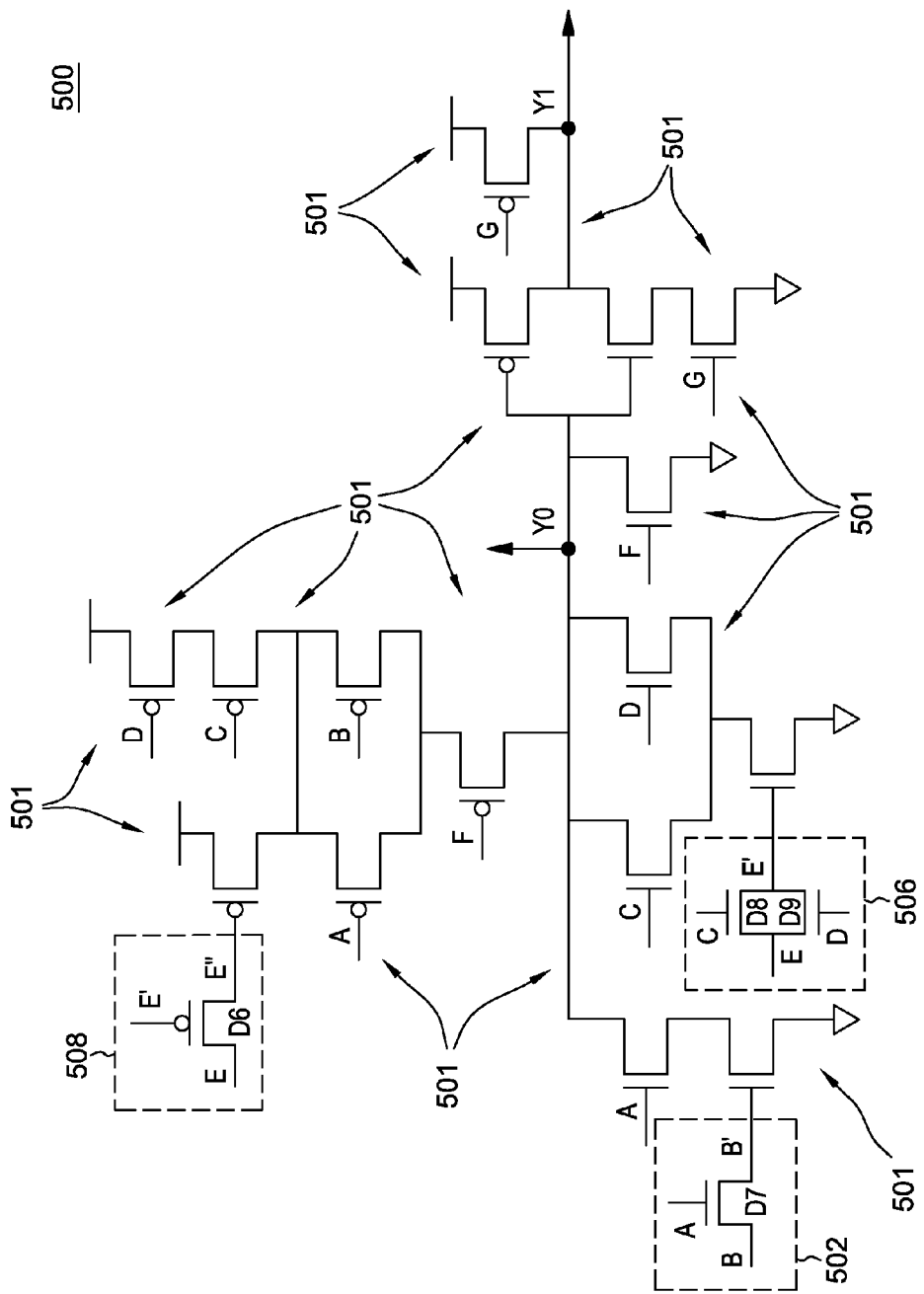
FIG. 4 is a schematic view of a fourth embodiment of a standard cell according to the present invention.

As shown in FIG. 4, standard cell 500 includes: logic circuitry 501; delay transistor (also called D6) 508; delay transistor (also called D7) 502; delay transistor pair (also called D8, D9) 506; slow input signal lines A, C, D; fast input signal lines B, E, F, G; output signal lines Y0, Y1; and signal lines E', E", B'. Standard cell 500 is a seven (7) input, two output standard cell. The logic functionality of logic circuitry 501 is representative of a complex and-or-invert gate, where the output Y0 is at logic low, and output Y1 is at a logic high when one or more combinations of the inputs are at logic high.

In standard cell 500, the slow input signals A, C, D are used to gate at least some of the fast input signals B, E, F, G. Of course, many, many different types of multiple input standard cells are possible under the present invention, but some pertinent features of standard cell 500 are: (i) there may be more than two inputs; (ii) more than one different slow input signal may be used as a gate voltage to effectively delay a faster input signal; and (iii) more than one different fast input signal may be delayed.

Some embodiments of the present invention may include one, or more, of the following features, characteristics and/or advantages: (i) standard cell design for handling fast paths in a vlsi (very large scale integrated) circuit; (ii) pass gate based standard cell design (that is, one input signal is used to gate another input signal); and (iii) gating fast signals with slow signals to fix hold violations in a standard cell.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Electrically Connected: means either directly electrically connected, or indirectly electrically connected, such that intervening elements are present; in an indirect electrical connection, the intervening elements may include inductors and/or transformers.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

What is claimed is:

1. Circuitry comprising:
a logic circuitry portion; and
a delay circuitry portion including a first transistor;
wherein:
the logic circuitry portion is structured and/or electrically connected to: (i) receive a set of input signals including at least a first input signal and a second input signal; and (ii) perform logic functionality on the set of input signals to generate a set of output signal(s); and
the first transistor is structured and/or electrically connected to gate the first input signal with the second input signal so that the first input signal is not received by the logic circuitry portion until the second input signal has arrived at the first transistor.

2. The circuitry of claim 1 wherein the logic circuitry portion and delay circuitry portion are integrated into an integrated circuit.

3. The circuitry of claim 2 wherein the integrated circuit is designed so that the first input signal arrives at the first transistor before the second input signal arrives at the first transistor.

4. The circuitry of claim 3 wherein the logic circuitry portion generates the set of output signal(s) by applying at least one of the following types logic functionality to the set of input signals: NAND, XOR, OR, AND, NOR, inverted NAND, inverted XOR, inverted OR, inverted AND, inverted NOR and/or complex gates using sub-combinations of the foregoing types of logic functionality.

5. The circuitry of claim 1 wherein the logic circuitry portion generates the set of output signal(s) by applying at least one of the following types logic functionality to the set of input signals: NAND, XOR, OR, AND, NOR, inverted NAND, inverted XOR, inverted OR, inverted AND, inverted NOR and/or complex gates using sub-combinations of the foregoing types of logic functionality.

6. Circuitry comprising:
a logic circuitry portion; and
a delay circuitry portion including a first transistor;
wherein:
the logic circuitry portion is structured and/or electrically connected to: (i) receive a set of input signal(s); and (ii) perform logic functionality on the set of input signals to generate a set of output signal(s) including at least a first output signal and a second output signal; and
the first transistor is structured and/or electrically connected to gate the first output signal with the second output signal so that the first output signal is not output by the logic circuitry portion until the second output signal has arrived at the first transistor.

7. The circuitry of claim 6 wherein the logic circuitry portion and delay circuitry portion are integrated into an integrated circuit.

8. The circuitry of claim 7 wherein the integrated circuit is designed so that the first output signal arrives at the first transistor before the second output signal arrives at the first transistor.

9. The circuitry of claim 8 wherein the logic circuitry portion generates the set of output signal(s) by applying at least one of the following types logic functionality to the set of input signals: NAND, XOR, OR, AND, NOR, inverted NAND, inverted XOR, inverted OR, inverted AND, inverted NOR and/or complex gates using sub-combinations of the foregoing types of logic functionality.

10. The circuitry of claim 6 wherein the logic circuitry portion generates the set of output signal(s) by applying at least one of the following types logic functionality to the set of input signals: NAND, XOR, OR, AND, NOR, inverted NAND, inverted XOR, inverted OR, inverted AND, inverted NOR and/or complex gates using sub-combinations of the foregoing types of logic functionality.

11. A method of designing an integrated circuit, the method comprising:
defining a set of standard cell(s) including code based representations of a logic circuitry portion, and a delay circuitry portion including a first transistor; and
applying the set of standard cell(s) into an integrated circuit design so that:
the logic circuitry portion is structured and/or electrically connected to: (i) receive a set of input signals including at least a first input signal and a second input signal; and (ii) perform logic functionality on the set of input signals to generate a set of output signal(s), and
the first transistor is structured and/or electrically connected to gate the first input signal with the second input signal so that the first input signal is not received by the logic circuitry portion until the second input signal has arrived at the first transistor.

12. The method of claim 11 wherein the application of the set of standard cell(s) is performed so that the first input signal arrives at the first transistor before the second input signal arrives at the first transistor.

13. The method of claim 11 wherein the logic circuitry portion generates the set of output signal(s) by applying at least one of the following types logic functionality to the set of input signals: NAND, XOR, OR, AND, NOR, inverted NAND, inverted XOR, inverted OR, inverted AND, inverted NOR and/or complex gates using sub-combinations of the foregoing types of logic functionality.

14. The method of claim 11 wherein:
the definition of the set of standard cell(s) is performed so that the delay circuitry and the logic circuitry are both included in a single standard cell.

\* \* \* \* \*